(12) United States Patent
Zhu et al.

(10) Patent No.: US 10,523,645 B2
(45) Date of Patent: Dec. 31, 2019

(54) METHOD AND SYSTEM FOR PROTECTING USER DATA USING INDIVIDUALIZED KEYS TO ENABLE SECURE COMPARTMENTALIZED DATA BACKUP/RESTORE

(71) Applicant: Vormetric, Inc., San Jose, CA (US)

(72) Inventors: Joshua Zhu, San Jose, CA (US); Qun He, San Jose, CA (US)

(73) Assignee: Thales Esecurity, Inc., Plantation, FL (US)

( * ) Notice: Subject to any disclaimer, the term of this patent is extended or adjusted under 35 U.S.C. 154(b) by 246 days.

(21) Appl. No.: 15/331,576

(22) Filed: Oct. 21, 2016

(65) Prior Publication Data
US 2018/0115537 A1    Apr. 26, 2018

(51) Int. Cl.
| | | |
|---|---|---|
| G06F 21/60 | (2013.01) | |
| G06F 12/14 | (2006.01) | |
| H04L 9/08 | (2006.01) | |
| H04L 29/06 | (2006.01) | |
| H04L 29/08 | (2006.01) | |

(52) U.S. Cl.
CPC ........ *H04L 63/061* (2013.01); *G06F 12/1408* (2013.01); *G06F 12/1441* (2013.01); *H04L 9/0894* (2013.01); *G06F 2212/1052* (2013.01); *H04L 63/0435* (2013.01); *H04L 67/1097* (2013.01)

(58) Field of Classification Search
CPC ....... H04L 9/08; H04L 63/0428; G06F 21/60; G06F 12/14
See application file for complete search history.

(56) References Cited

U.S. PATENT DOCUMENTS

2016/0323250 A1* 11/2016 Winter ................ H04L 63/0428

* cited by examiner

*Primary Examiner* — Izunna Okeke
(74) *Attorney, Agent, or Firm* — Womble Bond Dickinson (US) LLP (57) ABSTRACT

A data management system is provided. The system includes at least one processor, configured to couple to a plurality of domains of a storage memory. The at least one processor is configured to perform actions. The actions include securing data in each of the plurality of domains, using a plurality of domain protection keys, each domain protection key specific to one of the plurality of domains, and securing the plurality of domain protection keys, using a system protection key. A method for protecting user data is also provided.

17 Claims, 6 Drawing Sheets

METHOD AND SYSTEM FOR PROTECTING USER DATA USING INDIVIDUALIZED KEYS TO ENABLE SECURE COMPARTMENTALIZED DATA BACKUP/RESTORE

BACKGROUND

Data encryption and decryption, using keys, have long been available for protecting data. Secure storage systems store data in encrypted form, and secure communications send and receive data in encrypted form. Key management interoperability protocol is applied in many systems for managing keys. However, storage of all data in a storage system under a single key makes the storage system vulnerable to theft of that key. And, decrypting and re-encrypting data when multiple keys are in use in communications and storage is resource intensive and time-consuming, producing system bottlenecks. Also, decrypting and re-encrypting data for data migration, backup and/or restore operations is problematic. Therefore, there is a need in the art for a solution which overcomes the drawbacks described above and improves protection of user data that is moved from one location or system to another and stored.

SUMMARY

In some embodiments, a data management system is provided. The system includes at least one processor, configured to couple to a plurality of domains of a storage memory. The at least one processor is configured to perform actions. The actions include securing data in each of the plurality of domains, using a plurality of domain protection keys, each domain protection key specific to one of the plurality of domains, and securing the plurality of domain protection keys, using a system protection key.

In some embodiments, a tangible, non-transitory, computer-readable media having instructions thereupon which, when executed by a processor, cause the processor to perform a method. The method includes creating a plurality of domains in a storage memory, with each domain associated with a domain protection key specific to the domain. The method includes securing data in the plurality of domains with a plurality of such domain protection keys, and encrypting the plurality of domain protection keys with a system protection key.

In some embodiments, a method for protecting user data, performed by a data management system is provided. The method includes managing a plurality of domains of a storage memory and securing data in the plurality of domains with a plurality of domain protection keys, each domain protection key specific to one of the plurality of domains. The method includes securing the plurality of domain protection keys with a system protection key.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of a data management system, disclosed herein, manage multiple domains in storage memory, using domain protection keys specific to domains, and multiple levels of keys. Exporting of data, data migration, data backup and data restore to or from a domain make use of data storage and transmission of data that is encrypted by the domain protection key for that domain, without decrypting and re-encrypting the data. Domain protection keys are secured by a system protection key, which is in turn secured by a master key. A domain wrapper key, specific to each domain, is used for wrapping encrypted data and one or more keys, as an object for exporting data. In some embodiments, keys are managed using the key management interoperability protocol.

Figure 1:
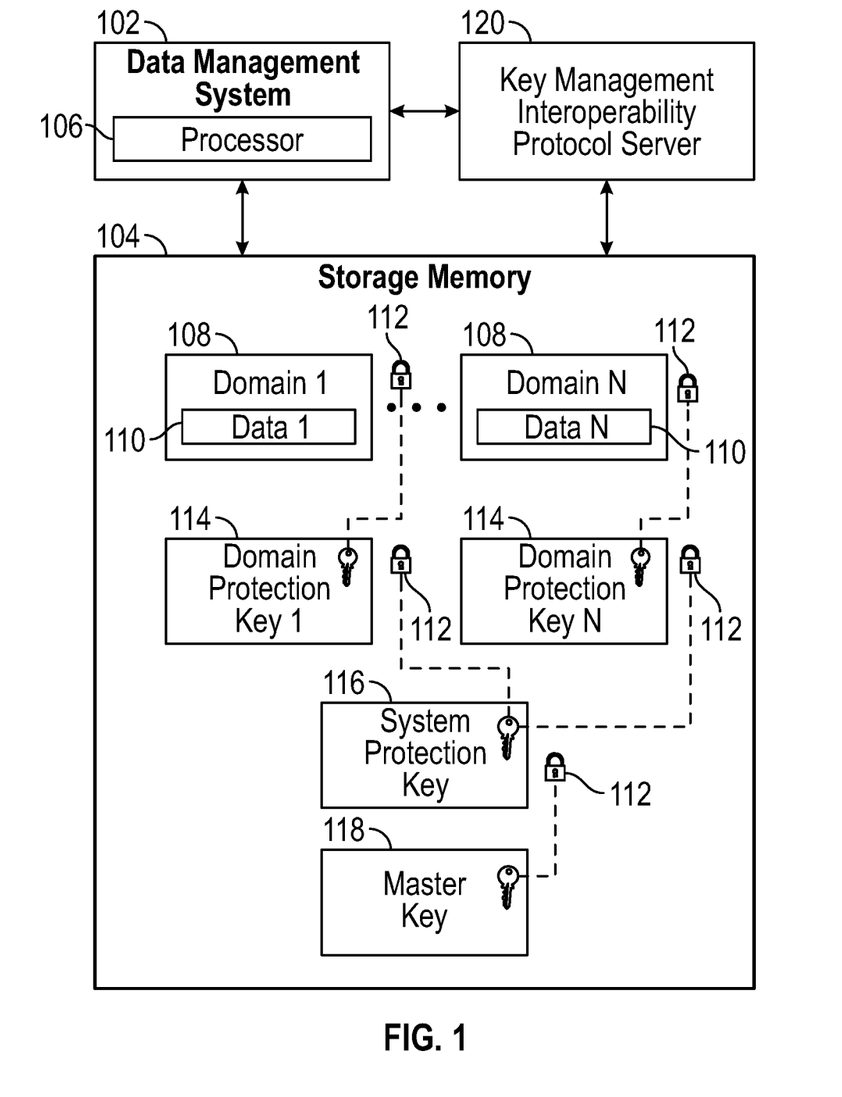
FIG. 1 is a system diagram for a data management system that manages multiple domains in storage memory, with data stored in encrypted form in the domains and each domain having its own domain protection key in accordance with some embodiments.

FIG. 1 is a system diagram for a data management system 102 that manages multiple domains 108 in storage memory 104, with data 110 stored in encrypted form in the domains 108 and each domain 108 having its own domain protection key 114. In some embodiments, the data management system 102 and/or the storage memory 104 interacts with a key management interoperability protocol server 120, for managing various keys. The data management system 102 partitions or divides the storage memory 104 into various domains 108, for example domains 108 labeled "domain 1" through "domain N" as shown in FIG. 1. Data 110 stored in the domain 108 labeled "domain 1" and encrypted by the domain protection key 114 labeled "domain protection key 1" is labeled "data 1", and data 110 stored in the domain 108 labeled "domain N" and encrypted by the domain protection key 114 labeled "domain protection key N" is labeled "data N". Securing by encryption is symbolized by a lock 112, with dashed lines leading from the lock 112 to the corresponding key, i.e., the encryption and decryption key for that securing of data or securing of a key.

The domain protection keys 114 in the storage memory 104 are secured or encrypted by the system protection key 116. In turn, the system protection key is encrypted or secured by the master key 118. Each domain protection key 114 is specific to one and only one domain 108, and each domain 108 has one and only one domain protection key 114. In further embodiments, other keys are used for securing the domain protection keys 114, or keys may have multiple uses. Various functions that the data management system 102 performs can be implemented as software executing on the processor 106, hardware, firmware, or combinations thereof. Some functions can be shared between the data management system 102 and the storage memory 104, or performed by the storage memory 104. Key management, in various embodiments, is performed by the data management system 102 and the storage memory 104 in cooperation with the key management interoperability protocol server 120, or a subset of these in various subcombinations.

Figure 2:
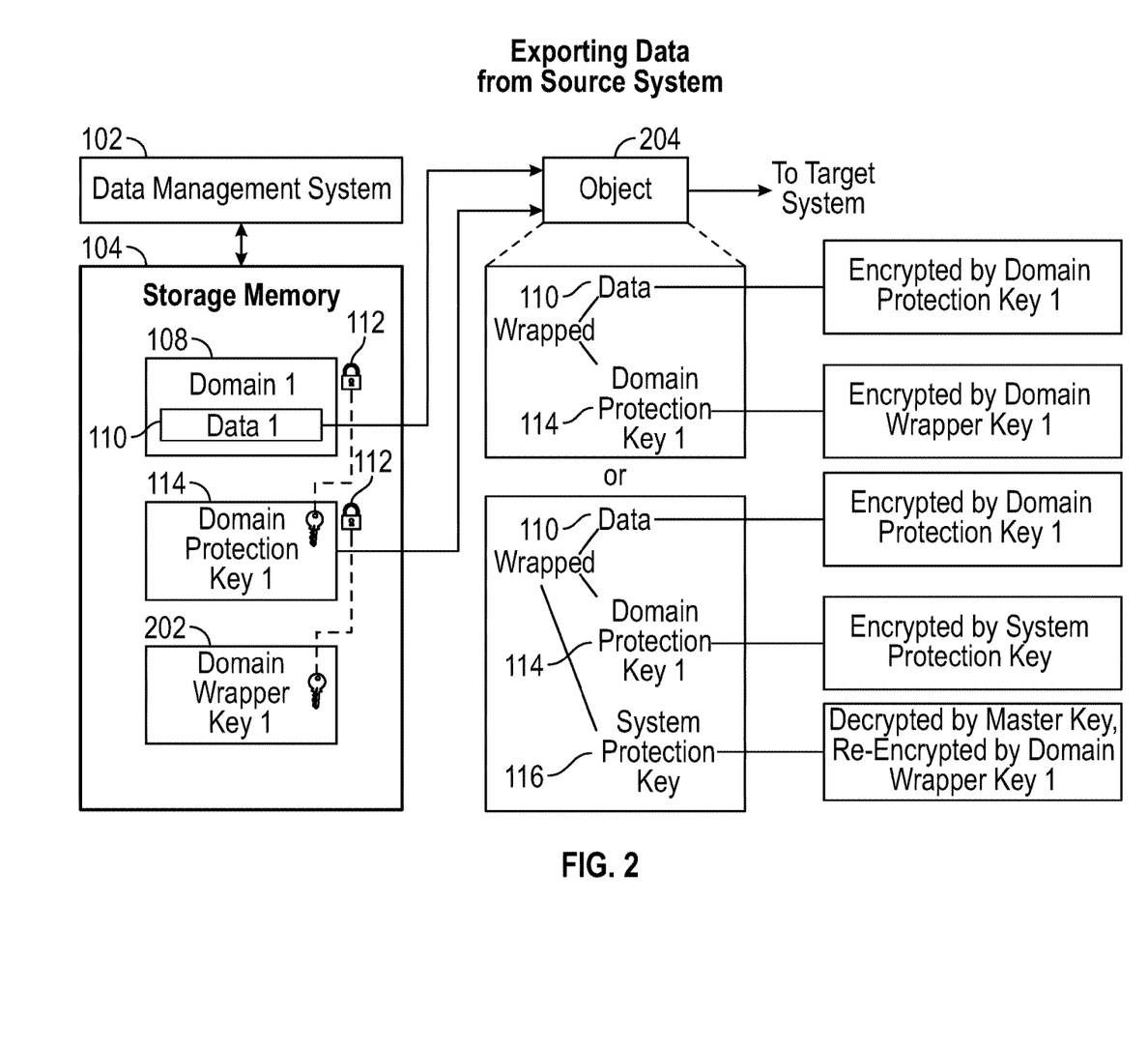
FIG. 2 depicts exporting data from the domain management system of FIG. 1 to a target system in accordance with some embodiments.

FIG. 2 depicts exporting data 110 from the domain management system 102 of FIG. 1 to a target system. As in FIG. 1, the data 110 is stored in encrypted form, secured by a domain protection key 114, for example "domain protection key 1", in a corresponding domain 108 in storage memory 104, for example "domain 1". In one embodiment, the data management system 102 prepares the encrypted data 110 to be exported to a target system as an object 204. This is done by wrapping the data 110, encrypted by the domain protection key 114 labeled "domain protection key 1" along with that domain protection key, which is encrypted by a domain wrapper key 202 labeled "domain wrapper key 1". To prepare "domain protection key 1" for exporting, that domain protection key 114, which is secured or encrypted by the system protection key 116, is decrypted by the system protection key 116 and re-encrypted by "domain wrapper key 1". This is shown in the upper right part of FIG. 2.

In a further embodiment, shown in the lower right part of FIG. 2, the wrapping is done by wrapping the data 110, encrypted by "domain protection key 1", the domain protection key 1 encrypted by the system protection key 116 (see FIG. 1), and the system protection key 116 encrypted by the domain wrapper key 202 labeled "domain wrapper key 1". To prepare the system protection key 116 for exporting, the system protection key 116, which is secured or encrypted by the master key 118, is decrypted by the master key 118 (see FIG. 1), and re-encrypted by "domain wrapper key 1".

Each domain 108 has one domain wrapper key 202, and each domain wrapper key 202 belongs to one domain 108. That is, each domain protection key 114 and each domain wrapper key is specific and exclusive to one domain 108. While the data management system 102 exports the data 110, the data 110 remains encrypted as the data 110 was while stored. It should be appreciated that in the embodiments, at no time during the exporting is the data 110 decrypted and re-encrypted. Exporting can be used for data transfer, data migration, backup, restore, and further operations. Importing can be performed by receiving the exported data, by receiving migrating data, by receiving backup data, or receiving restored backup data, for example as depicted in FIGS. 3 and 4.

Figure 3:
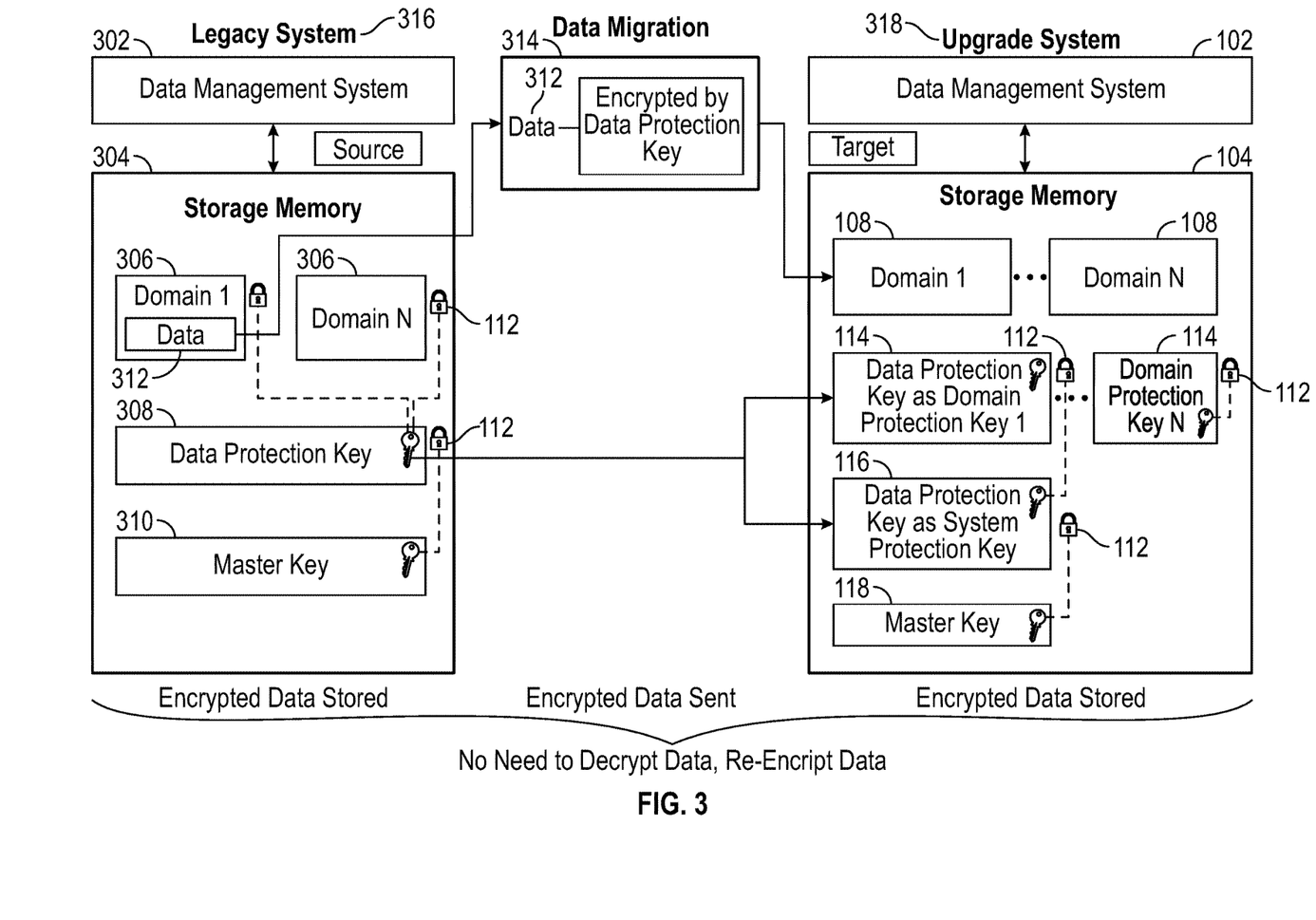
FIG. 3 depicts data migration from a legacy system to the domain management system of FIG. 1 as an upgrade system in accordance with some embodiments.

FIG. 3 depicts data migration from a legacy system 316 to the domain management system 102 of FIG. 1 as an upgrade system 318. In this example, the data is migrating from a first data management system 302, with domains 306 secured by a data protection key 308 (i.e., all domains 306 secured by the same, single, data protection key 308), to a second data management system 302, with domains 108 secured by individual domain-specific domain protection keys 114 as shown in FIG. 1. As a source, the legacy system 316 data management system 302 sends the data 312, for example in an object 314 which could be a file including the data 312 and one or more keys such as shown in FIG. 2, or in some other format. The data 312 is sent in encrypted form, i.e., encrypted by the data protection key 314 of the legacy system 316. Upon receipt of the data 312, e.g., in the object 314 or other format, the upgrade system 318 as the target system stores the still-encrypted data 312 in a domain 108, for example "domain 1". The data protection key 308 is stored as the domain protection key 114, for example "domain protection key 1" for "domain 1".

To prepare the data protection key 308 for storing as the domain protection key 114, the data management system 102 (of the upgrade system 318) encrypts the data protection key 308 with itself, then stores the self-encrypted data protection key 308 as the domain protection key 114 for the domain 108 into which the migrated, encrypted data 312 is written, e.g., "domain protection key 1" for "domain 1". And, the data management system 102 (of the upgrade system 318) encrypts the data protection key 308 with the master key 118, and stores the encrypted data protection key 308 as the system protection key 116. The data protection key 308 from the legacy system 316 is thus used at different levels in the upgrade system 318, as the domain protection key 114 for a domain 108, and as the system protection key 116 securing domain protection keys 114. In some embodiments, if data is migrated from multiple domains 306 of the legacy system 316 to multiple domains 108 in the upgrade system 318, the same data protection key 308 is used as the domain protection key 114 for each of these domains 108 in the upgrade system 318, and is also used as the system protection key 116 to secure all domain protection keys 114. As noted at the bottom of FIG. 3, encrypted data is stored in the legacy system 316, encrypted data is sent in the data migration, and encrypted data is stored in the upgrade system 318. There is no need to decrypt data and re-encrypt the data, when migrating.

Figure 4:
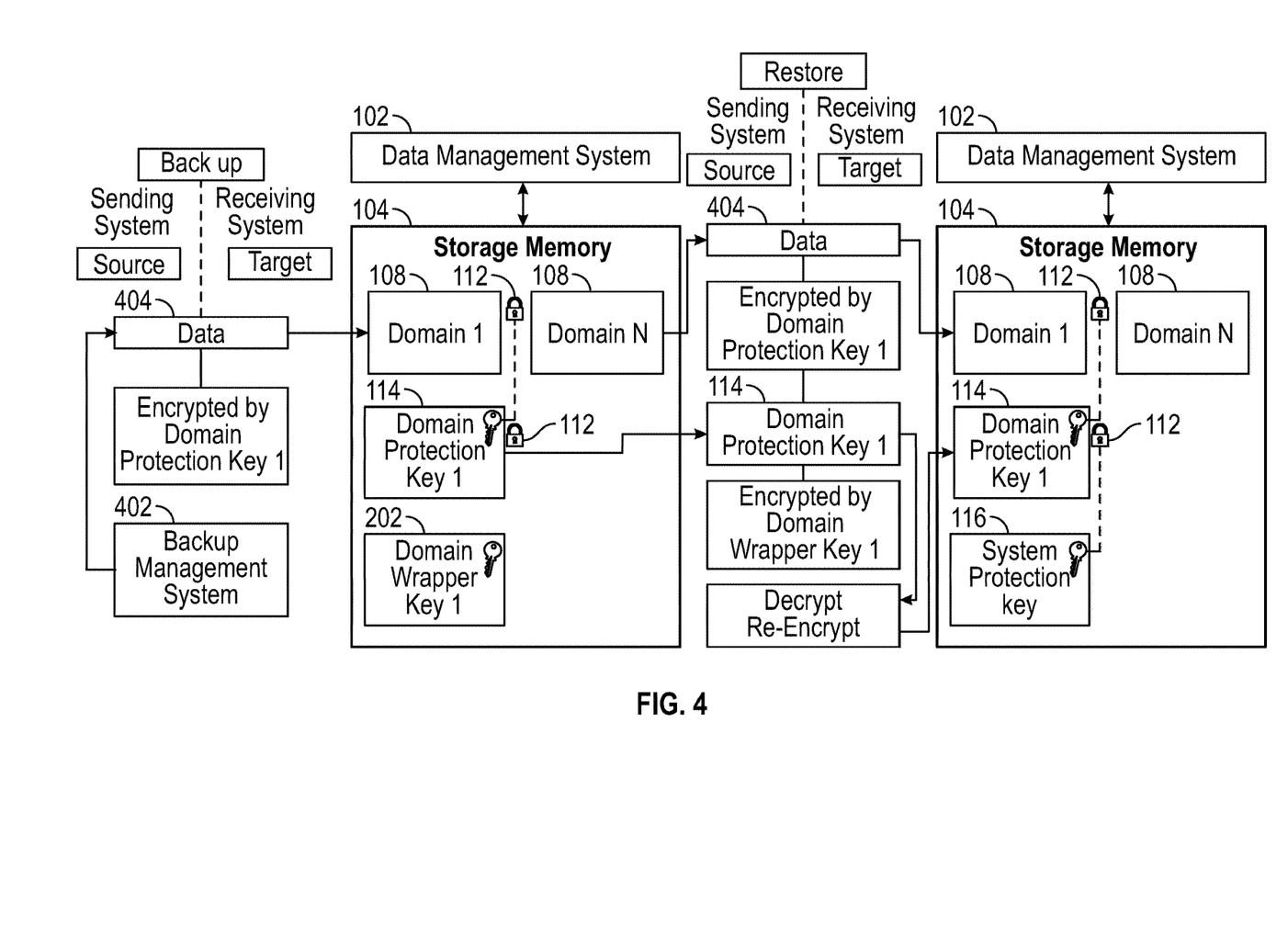
FIG. 4 depicts data backup and restore, using the data management system of FIG. 1 in accordance with some embodiments.

FIG. 4 depicts data backup and restore, using the data management system 102 of FIG. 1. These operations are combined in the drawing for purposes of illustration, but would usually occur at separate times. Also, although the backup management system 402, as the source or sending system in the backup scenario (left half of FIG. 4), is depicted as separate from the receiving target system in the restore scenario (right half of FIG. 4), these could be combined into the same system, as when a backup data set is restored to a system that originated the backup, but has later failed.

For backup, the source or sending system is the backup management system 402, and the target or receiving system is the data management system 102, including storage memory 104. The backup management system sends data 404, encrypted by "domain protection key 1", which could have some other name in further examples. Upon receiving the backup data, the data management system 102 stores the data 404, still in encrypted form, in a domain 108, for example "domain 1". The domain protection key 114 labeled "domain protection key 1" is stored, for example encrypted by the system protection key 116 as shown in FIG. 1. In various embodiments, the backup management system 402 and the data management system 102 could cooperate regarding the "domain protection key 1", for example using the key management interoperability protocol server 120.

For restore, the source or sending system is the first data management system 102 (i.e., middle of FIG. 4), and the target or receiving system is another or second data management system 102 (i.e., far right of FIG. 4). The source data management system 102 sends data 404, encrypted by "domain protection key 1", and also sends the domain protection key 114, e.g. "domain protection key 1", encrypted by the domain wrapper key 202, e.g., "domain wrapper key 1", for example with the data and the key wrapped in an object 204 as shown in FIG. 2. Upon receiving the backup data for restoration to the target system, the target data management system 102 stores the data 404, still in encrypted form as encrypted by "domain protection key 1", in a domain 108 in storage memory 104 of the target system, for example "domain 1". Also, the target or receiving data management system 102 decrypts the domain protection key 114, by the domain wrapper key 202, and re-encrypts the domain protection key 114 with the system protection key 116, storing the now re-encrypted domain protection key 114, e.g. "domain protection key 1". Similarly to data migration shown in FIG. 3, there is no need to decrypt data and re-encrypt the data, in either the backup or the restore operation. Keys, in some embodiments, are handled by cooperation with the key management interoperability protocol server 120 shown in FIG. 1.

Figure 5:
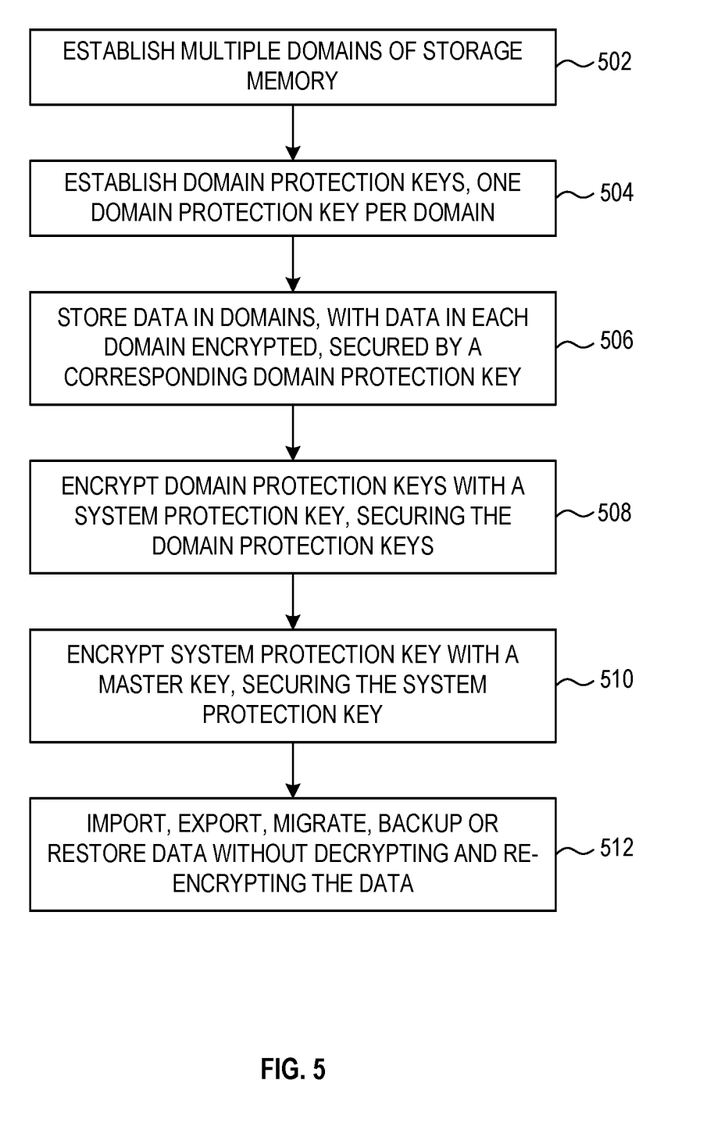
FIG. 5 is a flow diagram of a method for protecting data, performed by the data management system of FIGS. 1-4 or variations thereof in accordance with some embodiments.

FIG. 5 is a flow diagram of a method for protecting data, performed by the data management system of FIGS. 1-4 or variations thereof. In an action 502, multiple domains of storage memory are established. In an action 504, domain protection keys, with one domain protection key per domain, are established. It should be appreciated that the establishment of domain protection keys can be done by receiving keys or generating keys, and in some embodiments can be done in cooperation with a key management interoperability protocol server. In an action 506, data is stored in the domains of storage memory. Data in each domain is encrypted and thereby secured by a corresponding domain protection key. In an action 508, the domain protection keys are encrypted with (or by) a system protection key, securing the domain protection keys. That is, the system protection key secures the domain protection keys. Still referring to FIG. 5, in an action 510, the system protection key is encrypted with a master key. This secures the system protection key, i.e., the system protection key is secured by the master key. In an action 512, the system imports, exports, migrates, backs up or restores data, without decrypting and re-encrypting the data.

Figure 6:
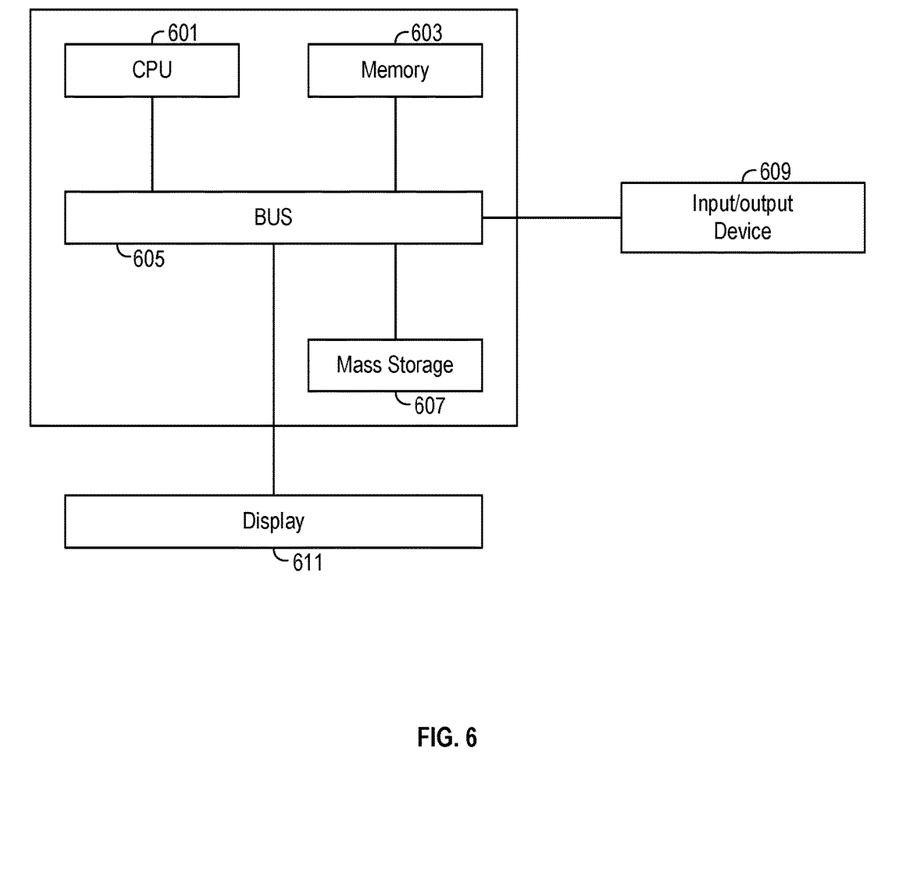
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for protecting data in multiple domains of storage memory in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A data management system, comprising:
   at least one processor, configured to couple to a plurality of domains of a storage memory; and
   the at least one processor configured to perform actions comprising:
   securing data in each of the plurality of domains, using a plurality of domain protection keys, each domain protection key specific to one of the plurality of domains;
   securing the plurality of domain protection keys, using a system protection key; and
   responsive to a request to export encrypted data of a selected one of the plurality of domains:
   encrypting a domain protection key specific to the selected one of the plurality of domains with a wrap key specific to the selected one of the plurality of domains;
   wrapping the encrypted data of the selected one of the plurality of domains and the encrypted domain protection key specific to the selected one of the plurality of domains and
   exporting the wrapped encrypted data and encrypted domain protection key specific to the first one of the plurality of domains, along with the wrap key specific to the selected one of the plurality of domains.

2. The data management system of claim 1, wherein the at least one processor is further configured to secure the system protection key, using a master key.

3. The data management system of claim 1, wherein the at least one processor is configured to perform data migration by performing further actions comprising:
   receiving migrating data from a further data management system, with the migrating data as first data encrypted by a first key;

storing the first data encrypted by the first key in a first one of the plurality of domains of the data management system; and encrypting the first key with the first key, the first key securing the first data as a first domain protection key specific to the first domain and the first key further acting as the system protection key to secure the first domain protection key.

4. The data management system of claim 1, wherein the at least one processor is configured to perform data migration by performing further actions comprising:

receiving migrating data from a further data management system, with the migrating data as first data encrypted by a first key;

storing the first data encrypted by the first key in a first one of the plurality of domains of the data management system; and encrypting the first key with the system protection key, the first key securing the first data as a first domain protection key specific to the first domain, and the system protection key securing the first domain protection key.

5. The data management system of claim 1, wherein the at least one processor is configured to restore backup data from the data management system to a further data management system by performing further actions comprising:

encrypting a first one of the plurality of domain protection keys, specific to a first one of the plurality of domains, using a domain wrapper key specific to the first one of the plurality of domains; and sending backup data, encrypted by the first one of the plurality of domain protection keys, and the encrypted first one of the plurality of domain protection keys, from the first one of the plurality of domains in the data management system to the further data management system.

6. The data management system of claim 1, wherein the at least one processor is configured to restore backup data from a further data management system to the data management system by performing further actions comprising:

receiving backup data encrypted by a first domain protection key, and the first domain protection key encrypted by a first domain wrapper key, from the further data management system;

storing the encrypted backup data in a first one of the plurality of domains;

decrypting the encrypted first domain protection key, using the first domain wrapper key;

re-encrypting the first domain protection key, using the system protection key; and storing the re-encrypted first domain protection key, secured by the system protection key, as a domain protection key specific to the first one of the plurality of domains.

7. A tangible, non-transitory, computer-readable media having instructions thereupon which, when executed by a processor, cause the processor to perform a method comprising:

creating a plurality of domains in a storage memory, with each domain associated with a domain protection key specific to the domain;

securing data in the plurality of domains with a plurality of such domain protection keys;

encrypting the plurality of domain protection keys with a system protection key; and responsive to a request to export encrypted data of a selected one of the plurality of domains:

encrypting a domain protection key specific to the selected one of the plurality of domains with a wrap key specific to the selected one of the plurality of domains; and wrapping the encrypted data of the selected one of the plurality of domains and the encrypted domain protection key into an object to be exported; and exporting the object, along with the wrap key specific to the selected one of the plurality of domains.

8. The computer-readable media of claim 7, wherein the method further comprises:

encrypting the system protection key with a master key.

9. The computer-readable media of claim 7, wherein the method further comprises:

receiving migrating data that is encrypted by a first domain protection key;

storing the encrypted migrating data in a first one of the plurality of domains; and encrypting the first domain protection key with itself, so that the first domain protection key secures the encrypted migrating data in the first one of the plurality of domains and the first domain protection key acts as the system protection key to secure the first domain protection key.

10. The computer-readable media of claim 7, wherein the method includes restoring backup data from a first data management system to a second data management system, comprising:

encrypting a first one of the plurality of domain protection keys with a domain wrapper key specific to the first one of the plurality of domains; and sending the backup data, encrypted by the first one of the plurality of domain protection keys, and the encrypted first one of the plurality of domain protection keys, from the first data management system to the second data management system.

11. The computer-readable media of claim 7, wherein the method further includes restoring backup data from a second data management system to a first data management system, comprising:

storing backup data, encrypted by a first domain protection key, in a first one of the plurality of domains in the first data management system, the encrypted backup data received from the second data management system;

decrypting an encrypted first domain protection key, using a first domain wrapper key specific to the first one of the plurality of domains, the encrypted first domain protection key received from the second data management system;

encrypting the decrypted first domain protection key, using the system protection key; and storing the system protection key-encrypted first domain protection key, as one of the plurality of domain protection keys, specific to the first one of the plurality of domains.

12. A method for protecting user data, performed by a data management system, comprising:

managing a plurality of domains of a storage memory;

securing data in the plurality of domains with a plurality of domain protection keys, each domain protection key specific to one of the plurality of domains;

securing the plurality of domain protection keys with a system protection key; and responsive to a request to export encrypted data of a selected one of the plurality of domains:

encrypting a domain protection key specific to the selected one of the plurality of domains with a wrap key specific to the selected one of the plurality of domains;

wrapping the encrypted data of the selected one of the plurality of domains and the encrypted domain protection key specific to the selected one of the plurality of domains; and exporting the wrapped encrypted data and the encrypted domain protection key specific to the selected one of the plurality of domains, along with the wrap key specific to the selected one of the plurality of domains.

13. The method of claim 12, further comprising:
securing the system protection key with a master key.

14. The method of claim 12, further comprising:
receiving migrating data from a further data management system, with the migrating data as first data encrypted by a first domain protection key;

storing the first data encrypted by the first domain protection key in a first one of the plurality of domains of the data management system; and encrypting the first domain protection key with the first domain protection key, the first domain protection key securing the first data and further acting as the system protection key to secure the first domain protection key.

15. The method of claim 12, further comprising:
receiving migrating data from a further data management system, with the migrating data as first data encrypted by a first domain protection key;

storing the first data encrypted by the first domain protection key in a first one of the plurality of domains of the data management system; and encrypting the first domain protection key with the system protection key to secure the first domain protection key.

16. The method of claim 12, further comprising:
restoring backup data from the data management system to a further data management system, wherein the backup data is encrypted by a first one of the plurality of domain protection keys and stored in a first one of the plurality of domains, the restoring comprising:

encrypting the first one of the plurality of domain protection keys with a domain wrapper key specific to the first one of the plurality of domains; and sending the backup data, encrypted by the first one of the plurality of domain protection keys, and the encrypted first one of the plurality of domain protection keys, from the data management system to the further data management system.

17. The method of claim 12, further comprising:
restoring backup data from a further data management system to the data management system, wherein the backup data is stored encrypted in the further data management system by a first domain protection key and the first domain protection key is encrypted in the further data management system by a first domain wrapper key, the restoring comprising:

storing the encrypted backup data in a first one of the plurality of domains in the data management system;

decrypting the encrypted first domain protection key, with the first domain wrapper key;

re-encrypting the first domain protection key, with the system protection key; and storing the re-encrypted first domain protection key, as one of the plurality of domain protection keys, specific to the first one of the plurality of domains.

* * * * *